United States Patent [19]

Cullie

[11] Patent Number: 4,462,420
[45] Date of Patent: Jul. 31, 1984

[54] SAFETY PRESSURE RELIEF VALVE

[75] Inventor: Eugene C. Cullie, Tappan, N.Y.

[73] Assignee: Teledyne Farris Engineering, Palisades Park, N.J.

[21] Appl. No.: 388,261

[22] Filed: Jun. 14, 1982

[51] Int. Cl.³ .......................................... F16K 31/122
[52] U.S. Cl. .................................. 137/488; 137/240; 251/360
[58] Field of Search ............ 137/478, 485, 488, 489.5, 137/492, 492.5, 240, 241; 251/25, 28, 360

[56] References Cited

U.S. PATENT DOCUMENTS

| | | | |
|---|---|---|---|
| 721,453 | 2/1903 | Lunken | 137/241 |
| 2,278,437 | 4/1942 | Gentzel | 137/478 |
| 2,619,109 | 11/1952 | Garrett et al. | 137/488 |
| 2,771,905 | 11/1956 | Griswold | 137/488 |
| 2,814,307 | 11/1957 | Hafele et al. | 251/25 |
| 2,996,074 | 8/1961 | Page et al. | 251/25 |
| 3,294,111 | 12/1966 | Abercrombie et al. | 137/492 |
| 3,304,951 | 2/1967 | Farris | 137/492 |
| 3,664,362 | 5/1972 | Weise | 137/492 |
| 3,771,553 | 11/1973 | Huet | 137/488 |
| 3,800,822 | 4/1974 | Baker | 137/492 |

FOREIGN PATENT DOCUMENTS 1325868 8/73 United Kingdom.
1377332 12/74 United Kingdom.
1530170 10/78 United Kingdom.

Primary Examiner—George L. Walton
Attorney, Agent, or Firm—Hopgood, Calimafde, Kalil, Blaustein & Judlowe

[57] ABSTRACT

An improved safety pressure relief valve which is particularly applicable to valves utilizing pressure taps for sensing the pressure within the inlet nozzle, such as pilot operated valves. The valve includes a valve body having an inlet opening into which a full nozzle is inserted. An annular port surrounds the periphery of the nozzle. An opening in the nozzle leading to the annular port provides for the insertion of a pilot or dipper tube therein. The valve body includes a channel leading between the annular port and an external tap for the pressure sensing line connected to the pilot control means. The design permits the nozzle to be rotated to any angular position with respect to the valve body, thus permitting ready assembly and disassembly of the valve. In a second embodiment, an annular port is used to permit direct injection of purging fluid into the nozzle to prevent its clogging.

9 Claims, 5 Drawing Figures

SAFETY PRESSURE RELIEF VALVE

BACKGROUND OF THE INVENTION

1. Field of the Invention

This invention relates generally to pressure relief valves. The invention specifically relates to, but is not limited to, pilot operated pressure relief valves utilizing a pressure tap for sensing the pressure within the nozzle of the valve. This invention also specifically relates to pressure relief valves of all types which are subject to clogging.

2. Description of the Prior Art

Existing pilot operated pressure relief valve designs utilizing an inlet pressure tap which is an integral part of the valve body must do so with either a "semi-nozzle" inlet design or one where the valve body itself forms the entire flow passage. In the semi-nozzle inlet design the inlet flow passage or primary pressure zone is formed in the valve body by the body itself and a seat or seat ring. The semi-nozzle design is illustrated in FIG. 1 of the drawings. The seat ring usually forms only a short portion of the inlet length through the valve, the valve body comprises the major length. The design permits a pitot tube to be inserted through the valve body wall into the inlet flow stream. This allows the pilot control of the pilot operated pressure relief valve to sense inlet pressure directly in the valve inlet. This is a desirable location to sense inlet pressure in most applications as it permits this type of pilot operated pressure relief valve to be self-contained, i.e., no auxiliary pitot connection is required to be installed elsewhere in the system. Since this type of pilot operated pressure relief valve is complete in itself, it may be installed without further consideration to piping requirements.

Due to the fact that the semi-nozzle valve inlet has two components comprising the inlet flow stream, the body and seat ring, there is, by necessity, a mechanical connection between these two parts. This connection may be a direct connection by threading, welding, etc., or the seat ring may be held in place by other components designed so as to directly load it against the valve body. The former method often proves to be difficult or costly to remove because of corrosion on the threaded connection or because removal of the weld poses difficulties in completing such a task successfully. In addition to the difficulty in removing the seat ring, the semi-nozzle design requires that where a carbon steel valve body is used, the inlet passage be comprised of non-corrosion resistant material unless the entire valve body is made of a more expensive corrosion-resistant material.

Only pilot operated pressure relief valves of the semi-nozzle design could employ an integral pitot tube in the inlet flow passage. Although full nozzle inlet pilot operated pressure relief valve designs (illustrated in FIG. 2) have been widely used, this design could not adopt the integral pitot tube principle since no portion of the valve body communicated directly with the inlet flow passage. A separate collar for mounting the pitot tube to the underside of the nozzle is shown in U.S. Pat. No. 3,791,553.

In the full nozzle design, only the nozzle is subjected to inlet pressure and flow. Attempts have been made to insert a pitot tube in a full nozzle valve through that portion of the full nozzle that extends below the valve body. With this method a full nozzle valve may integrally employ a pitot tube but several difficulties arise from this method. Due to the fact that the full nozzle is entirely a separate component from the valve body, a mechanical connection between the two is required. Typically, a screw thread on the full nozzle exterior engages a screw thread on the valve body at relative positions. The nozzle is therefore attached to the valve body by this connection. The screw thread does not provide for any angular adjustment of the nozzle relative to the body; therefore, the nozzle does not have any predetermined radial position relative to the valve body.

Should a full nozzle employ a pitot tube in the portion that extends beyond the valve body, no predetermined position for the pitot tube connection can be assumed. The installed position may be such that connecting the pilot control is difficult or impossible should the connection be located adjacent to a stud bolt position. There may be as many as 20 stud bolts which leave very little room for the pitot tube connection to be positioned between. This position could be predetermined by a trial fitting of the nozzle to the body to allow exact placement of the pitot tube drilling and tapping in the desired position. However, this is cumbersome from a manufacturing standpoint and would not permit any subsequent machining on the body or full nozzle that would alter this unique physical relationship.

A problem which affects pressure relief valves of all types, both pilot operated and spring operated, such as that disclosed in my U.S. patent application Ser. No. 276,934 filed June 24, 1981, is the clogging of the nozzles in "dirty" environments. In numerous applications, the fluid within the pressure vessel contains contaminates such as solid media or the fluid itself is subject to solidification. In such applications a coating of solids may begin to form around the interior surface of the nozzle of the pressure relief valve. If the solid material builds up, the inner diameter of the nozzle may even become completely clogged or sealed by the solidified material. When this occurs, the operation of the pressure relief valve may become completely impaired with potentially dangerous consequences. One approach to solving the unclogging problem is to inject high pressure steam through the valve body and directed to the valve seat. While this may clear the seat itself, it will not unclog the interior of the nozzle. The only way to clear the interior surface of the nozzle would be a shut down of the pressure vessel and a disassembly of the valve. Obviously, this raises severe down time problems and is not a task lightly or frequently undertaken.

SUMMARY OF THE INVENTION

The present invention permits a full nozzle design to be utilized as the inlet flow passage within the valve body while containing a pitot tube as an integral part. The pipe connection to the pitot tube is in a fixed location within the valve body and communicates directly with the pitot tube in the nozzle regardless of its final angular position relative to the valve body. This is accomplished by an annular port surrounding the nozzle at the level of the pitot tube. This annular port may be wholly contained within the valve body or be formed by both the full nozzle and the valve body. It is sized such that pressure sensed by the pitot tube is transmitted via the annular port to the pipe connection in the valve body even when they are at a maximum distance apart, i.e., 180°. The annular port, subjected to the pressure within the inlet passage, is sealed via elastomeric, plastic or metallic seals which surround the annular port and effectively make it pressure tight.

Another embodiment of the invention is the use of the annular port at the nozzle/valve body interface to permit direct injection of high pressure steam or other purging material within the interior of the nozzle. A series of injection ports about the periphery of the nozzle permit the purging material to remove the clogging. The amount of pressure needed to dislodge the built up material is an indication of the severity of the clogging problem. The pressure measurement may also be used to determine when the clogging has been completely removed.

Accordingly, it is an object of this invention to provide an improved pressure relief valve.

It is another object of this invention to provide an improved pilot operated pressure relief valve.

It is another object of this invention to provide an improved pressure relief valve which does not utilize a separate extension for mounting a pressure sensing device.

It is another object of this invention to provide a pilot operated pressure relief valve which may utilize the full nozzle design.

It is another object of this invention to provide a pilot operated pressure relief valve which may utilize an integral pitot pressure pick-up within a full nozzle design.

It is another object of this invention to provide an improved pilot operated pressure relief valve in which wear, disassembly and reassembly will not affect the operation of the pressure sensing device.

It is another object of this invention to provide an improved pressure relief valve in which the interior surface may be unclogged without disassembly of the valve.

It is another object of this invention to provide an improved pressure relief valve in which the amount of clogging of the valve can be determined by external means and the unclogging of the valve can be assured by external measurements.

Still other objects of this invention will become apparent upon a reading of the detailed specification to follow.

BRIEF DESCRIPTION OF THE DRAWINGS

In order to better understand the invention, reference is made to the following drawings which are to be taken in conjunction with the detailed specification to follow.

DESCRIPTION OF THE PREFERRED EMBODIMENTS

Figure 1:
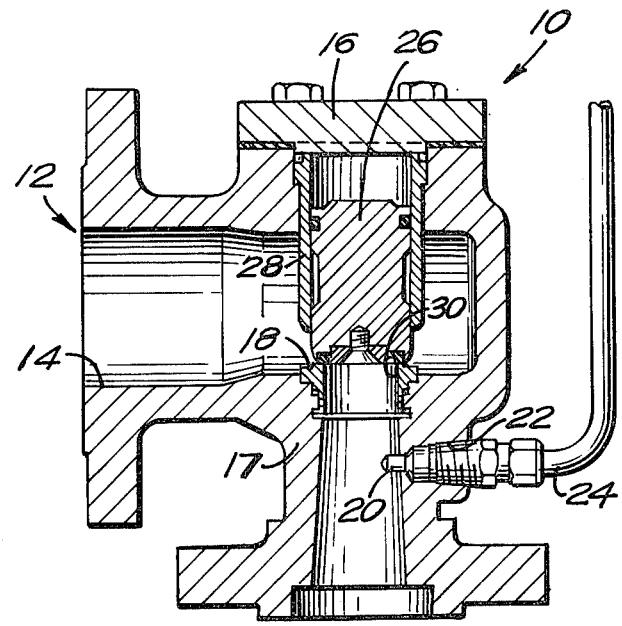
FIG. 1 is a sectional view of a prior art "Semi-nozzle" design pilot operated pressure relief valve.

FIG. 1 illustrates a typical "semi-nozzle" pilot operated safety-relief valve 10 in accordance with the teachings of the prior art. Valve 10 includes a valve body 12 having an outlet 14 and a cover plate 16. The nozzle portion of valve 10 is formed by the lower portion 17 of valve body 12 and a seat ring 18 which is mechanically connected to portion 17 of valve body 12. A pitot or "dipper" tube 20 is inserted within an opening 22 in portion 17 of valve body 12. A sensing line 24 is coupled to a pilot control (not shown) which operates the control mechanism for a piston 26 which is slidably displaceable within a cylinder 28 to seal the mouth 30 of the nozzle formed by seat ring 18. As can be seen, the pressure sensing device is directly inserted in an opening within the nozzle formed in portion 17 of valve body 12.

Figure 2:
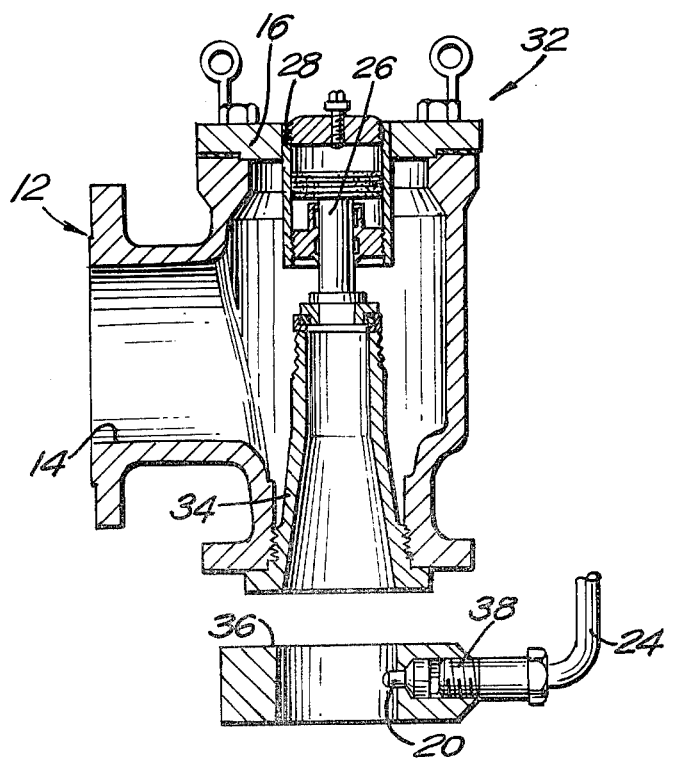
FIG. 2 is a sectional view of a prior art "Full nozzle" pilot operated pressure relief valve and pressure sensing accessory.

FIG. 2 illustrates a typical "full nozzle" pilot operated safety-relief valve 32 in accordance with the teachings of the prior art and in which like reference numerals have been utilized to refer to like structure shown in FIG. 1. As can be seen in the design, a full nozzle portion 34 is threaded to valve body 12 and no seat ring is utilized in the design. Since nozzle 34 is completely separate from valve body 12, there is no pressure tap located within valve body 10. Instead, an accessory collar 36, which sits between the valve and the pressure vessel, is utilized. The pressure sensing device 20 is disposed in an opening 38 in collar 36. Collar 36 is then mechanically coupled between valve 32 and the pressure vessel (not shown).

Figure 3:
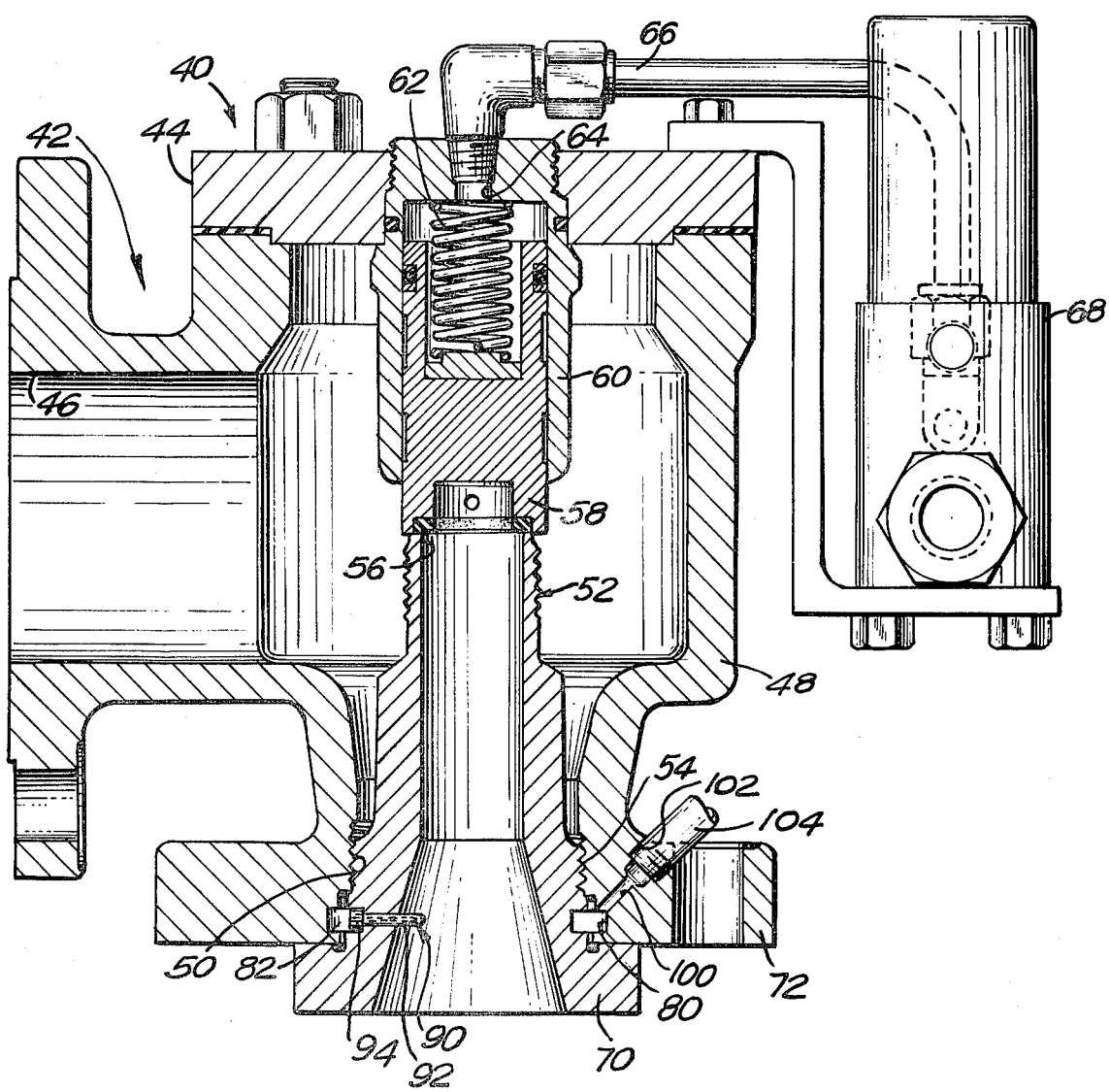
FIG. 3 is a sectional view of a pressure relief valve constructed in accordance with the instant invention in which the pitot tube is shown displaced by 180 degrees from the location of the connector to the pilot control.

FIG. 3 illustrates a safety pressure relief valve 40 constructed in accordance with the present invention. Valve 40 includes a valve body 42 having a mechanically coupled cover plate 44 and an exhaust opening 46. The lower portion 48 of valve body 42 includes an internally threaded inlet opening 50 for receiving a full nozzle 52. Nozzle 52 has external threads 54 for engaging opening 50 in lower portion 48 of valve body 42. The throat 56 of nozzle 52 is engaged and sealed by a piston 58 slidably disposed in a cylinder 60. Also disposed within cylinder 60 is a spring 62 for biasing piston 58 into engagement with throat 56 of nozzle 52. Cylinder 60 is threaded to cover plate 44 and includes an opening 64, to which is coupled a control line 66 which is connected to a pilot control 68.

Fluid flows between pilot control 68 and cylinder 60 through line 66 to operate piston 58. Pilot control 68 will, when the pressure of the pressure vessel (not shown) is within preset parameters, bias piston 58 against mouth 56 of nozzle 52, thus maintaining the pressure within the pressure vessel. When the pressure sensed by the pilot control 68 is above the preset parameters, it will reduce the pressure in control line 66 to permit piston 58 to be displaced away from mouth 56 of nozzle 52, releasing the pressure from the pressure vessel. The released pressure flows through nozzle 52, valve body 42 and is exhausted through outlet 46. The details of the construction of pilot control 68 and piston 58 have been omitted since they are known to those skilled in the art and do not form part of the present invention.

Figure 4:
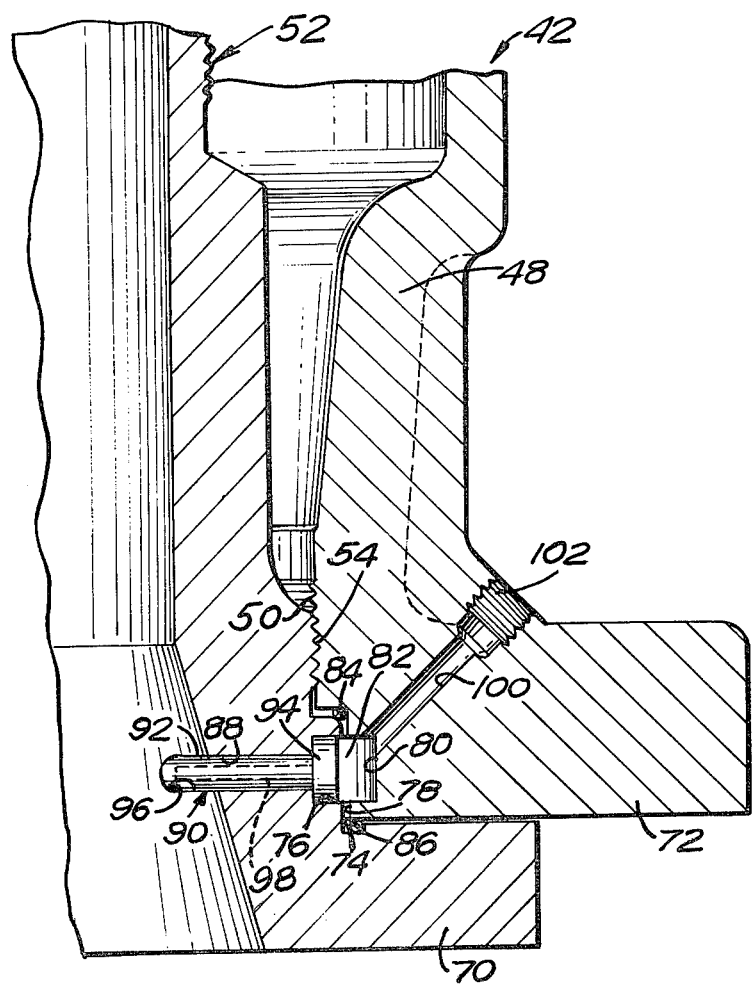
FIG. 4 is an enlarged sectional view of the interface between the nozzle and valve body of a valve constructed in accordance with the instant invention in which the pitot tube is shown at the location of the connector to the pilot control.

Attention should now be given to FIG. 4 in addition to FIG. 3. FIG. 4 illustrates in detail the interface between nozzle 52 and lower portion 48 of valve body 42. The lowermost part of nozzle 52 includes a flange 70 which is disposed along the underside of the lower flange 72 of valve body 42. A cylindrical surface 74 surrounding the lower periphery of nozzle 52 is generally perpendicular to flange 70 of nozzle 52. Surface 74 has a diameter slightly greater than that of threading 54 on nozzle 52. An annular recess 76 is disposed in surface 74. Flange 72 of valve body 42 also includes a cylindrical surface 78 which is contiguous with surface 76 of nozzle 52. An annular recess 80 is disposed in surface 78 so that recesses 80 and 76 form an annular port 82 surrounding the periphery of the interface between nozzle 512 and portion 48 of valve body 42.

An upper circumferential seal 84 and a lower circumferential seal 86 are located between opposed surfaces 74 and 78 to maintain a pressure seal around port 82 to maintain port 82 at the same pressure as the interior of nozzle 52. Seals 84, 86 may be in the form of O-rings or other suitable seals and may be constructed of elastomeric, plastic or metallic materials. While annular port 82 has been shown as being disposed both in nozzle 52 and portion 48 of valve body 42, it is to be noted that port 82 may alternately be formed entirely in either nozzle 52 or valve body 42. The configuration of port 82 is not critical, it is only necessary that it not restrict the transmission of pressure from nozzle 52. The materials used in the construction of valve 40 may be identical to those used in prior configurations.

An opening 88 leading to the interior of nozzle 52 is disposed in recess 76 in nozzle 52. A pitot or dipper tube 90 having a shaft 92 and a head 94 is placed within opening 88. Pitot tube 90 is of standard configuration and includes an opening 96 exposed to pressure within nozzle 52 and an interior channel 98 for communicating the pressure within the interior of nozzle 52 to port 82. A channel 100, including a tapped port 102, is formed within flange 72 of valve body 42. Channel 100 communicates the fluid pressure within annular port 82 to a pressure sensing line 104 which in turn is connected to pilot control 68.

The pressure within nozzle 52 is communicated through pitot tube 90 to port 82. Thereafter, the pressure within port 82 is communicated through channel 100 in flange 72 of valve body 42 to line 104 which in turn is transmitted to pilot control 68. Thus, there is no mechanical connection between pitot tube 90 and pilot control line 104. Rather, both communicate with annular port 82. This permits pitot tube 90 and nozzle 52 to be rotated to any angular position with respect to channel 100 and valve body 42 without in any way disturbing the pressure measurements. Differences in position between nozzle 52 and valve body 42 may occur due to wear and disassembly; however, in the arrangement illustrated such differences are to no effect. The pressure sensing apparatus will operate as effectively when nozzle 52 is rotated so that pitot tube 90 is 180 degrees apart from channel 100 in valve body 42 as shown in FIG. 3 as when both are at the same angular position as shown in FIG. 4.

Figure 5:
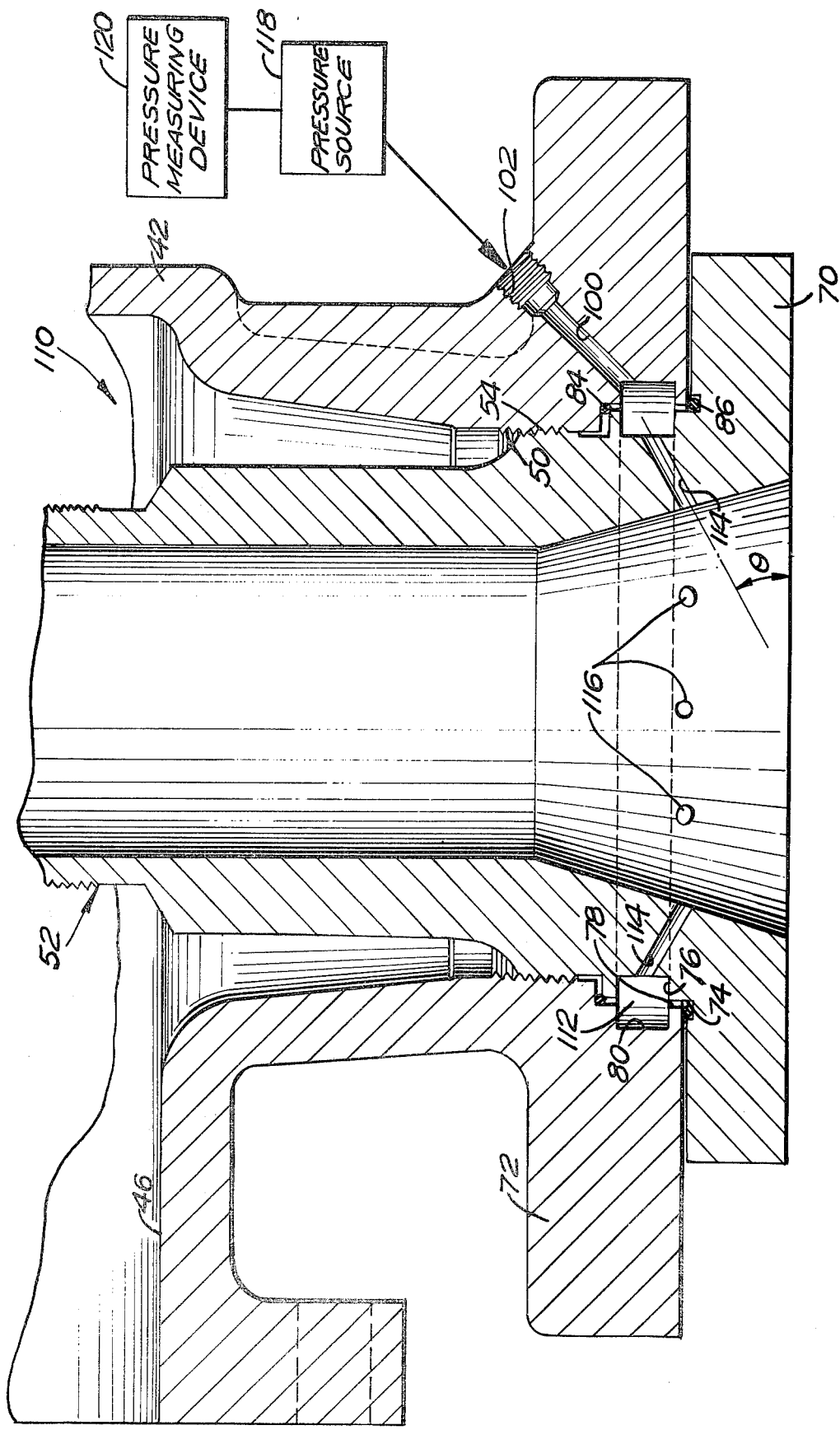
FIG. 5 is an enlarged sectional view of the nozzle/valve body interface of a valve constructed in accordance with another embodiment of the instant invention in which an annular port is used to permit the direct injection of steam or other purging material into the interior of the nozzle to prevent the clogging thereof.

FIG. 5 illustrates another embodiment of the invention which permits the direct injection of purging material into the interior of the nozzle to prevent clogging of the nozzle and valve. In this embodiment like reference numerals have been used to illustrate like structure to that previously described. In this embodiment a valve 110 has an annular port 112 located at the nozzle/valve body interface. The construction of port 112 is in all respects identical to that of annular port 82 previously described. The difference in structure is the inclusion of a series of channels 114 which lead to injection ports or openings 116 permitting fluid communication between annular port 112 and the interior of nozzle 52. Channels 114 are disposed at a generally downward angle $\theta$ so that the purging fluid will direct the removed clogging material away from the nozzle. Injection ports 116 are preferably equi-angularly spaced about the inner periphery of nozzle 52. Angle $\theta$ and the number of injection ports 116 are selected from empirical measurements as a function of the difficulty of removing the clogging material. The position of channels 114 and injection ports 116 is preferably situated relatively close to the mouth of nozzle 52 so as to assure against clogging within the entire length of nozzle 52.

In operation, high pressure steam or other purging material will be injected from a line attached to port 102 through channel 100 in flange 72 of valve body 42 and will pass into annular port 112 and thereafter through channels 114 to injection ports 116 to dislodge the clogging material. The steam, compressed air or other purging material is supplied by a pressure source 118. Coupled to pressure source 116 is a pressure measuring device 120 which may be of any of the usual types to measure the pressure delivered to valve 110. The pressure measurement may be used to detect a nozzle which is in the process of becoming clogged or plugged. When the purging material is injected, the greater the amount of pressure required to unplug the nozzle, the greater degree of plugging of the nozzle. When the pressure of the injected purging material drops to the level, previously measured, of a clean nozzle assembly, assurance will be had that the nozzle has been completely unplugged.

The use of annular port 112 to permit the injection of purging material into the nozzle is not limited to pilot operated valves but may also be used with respect to other safety relief valves such as the usual type of spring-loaded "pop-off" valves. Again, as in the previous embodiment, the angular position of nozzle 52 with respect to valve body 42 is unimportant since annular port 112 assures fluid communication between the external source of pressure and the interior of the nozzle. Thus any wear of the threading causing the nozzle to seat at a different rotational position with respect to the valve body will not in any way effect the operation or unclogging og the valves.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An improved pressure relief valve comprising:
   a valve body, said valve body including an inlet opening, an outlet opening and a valve means;
   nozzle means joined to said inlet opening of said valve body for receiving a fluid pressure to be controlled by said valve means to the outlet opening, said nozzle means including a throat located within said valve body and means for mounting a pitot tube;

an annular port disposed about the periphery of said nozzle at the interface between said valve body and said nozzle;

means for sealing said annular port for maintaining the fluid pressure within said annular port;

a pitot tube mounted to said mounting means of said nozzle and extending into said nozzle for communication of the pressure within said nozzle to said annular port;

outlet means disposed in said valve body for communicating the pressure within said annular port to the exterior of said valve body for controlling a remote means; and said annular port providing communication of the fluid pressure within said nozzle to said outlet means regardless of the angular position of said nozzle and pilot tube with respect to said valve body.

2. The pressure relief valve as claimed in claim 1 wherein said annular port is disposed in at least one of said nozzle and said valve body.

3. The pressure relief valve as claimed in claim 1 wherein said sealing means includes circumferential sealing members disposed within said annular port.

4. The pressure relief valve as claimed in claim 1 wherein said nozzle is joined to said valve body through interengaging threads.

5. The pressure relief valve as claimed in claim 1 wherein said outlet means includes a channel disposed in said valve body.

6. The pressure relief valve as claimed in claim 5 wherein said channel disposed in said valve body includes means for attaching an external pressure transmitting line thereto.

7. The pressure relief valve as claimed in claim 1 further including a cylindrical surface disposed on said nozzle, said cylindrical surface being generally parallel to the longitudinal axis of said nozzle, and a recess disposed in said cylindrical surface, said recess forming at least a portion of said annular port.

8. The pressure relief valve as claimed in claim 1 or claim 7 wherein said valve body includes a cylindrical surface, said cylindrical surface being generally parallel to the longitudinal axis of said nozzle and a recess disposed in said surface, said recess forming at least a portion of said annular port.

9. The pressure relief valve as claimed in claim 8 of said remote means includes a pilot operated means, said pressure within said annular port being communicated to said pilot operated means to thereby operate said valve means.

* * * * *